United States Patent
Van Bijsterveld

(10) Patent No.: US 6,641,331 B2
(45) Date of Patent: Nov. 4, 2003

(54) METHOD FOR INSTALLING A DUCT IN THE GROUND AND DEVICE FOR PERFORMING THIS METHOD

(75) Inventor: Cornelis Casparus Van Bijsterveld, Voorschoten (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 10/204,917

(22) PCT Filed: Jun. 18, 2001

(86) PCT No.: PCT/EP01/06940
§ 371 (c)(1),
(2), (4) Date: Aug. 26, 2002

(87) PCT Pub. No.: WO02/07277
PCT Pub. Date: Jan. 24, 2002

(65) Prior Publication Data
US 2003/0012606 A1 Jan. 16, 2003

(30) Foreign Application Priority Data
Jul. 17, 2000 (NL) .............................................. 1015729

(51) Int. Cl.⁷ ................................................. F16L 55/26
(52) U.S. Cl. .............. 405/184.1; 405/184; 254/134.3 R
(58) Field of Search ............................. 405/174, 183.5, 405/184, 184.1, 184.4; 254/134.3 R

(56) References Cited

U.S. PATENT DOCUMENTS

| | | |
|---|---|---|
| 5,096,000 A | 3/1992 | Hesse |
| 5,360,291 A * | 11/1994 | Shimizu .................. 405/183.5 |
| 5,639,183 A | 6/1997 | Griffioen et al. |
| 5,885,027 A * | 3/1999 | Marsden et al. ............ 405/184 |

FOREIGN PATENT DOCUMENTS

| | | |
|---|---|---|
| DE | 195 04 484 C1 | 9/1996 |
| EP | 0 292 037 A1 | 11/1988 |
| FR | 2 752 952 A1 | 3/1998 |
| GB | 2 085 670 A | 4/1982 |
| GB | 2 103 888 A | 2/1983 |
| GB | 2 126 800 A | 3/1984 |
| WO | WO 96/02012 A1 | 1/1996 |

* cited by examiner

*Primary Examiner*—Heather Shackelford
*Assistant Examiner*—Sunil Singh
(74) *Attorney, Agent, or Firm*—Frishauf, Holtz, Goodman & Chick, P.C.

(57) ABSTRACT

Method for installing a duct (2) in the ground, whereby a longitudinal element (1) is already present in the ground near the route along which the duct (2) is to be installed, whereby the existing longitudinal element (1) is used as a guide for the duct (2) to be installed and the duct (2) is pushed into the ground with the aid of a fluid under pressure fed through the duct (2), whereby the duct (2) to be installed is coupled to the existing longitudinal element (1) by at least one divisible coupling piece (3) and whereby the coupling element is advanced along the existing longitudinal element (1) The invention also provides a coupling piece (3) for guiding the duct (2) along the longitudinal element (1).

20 Claims, 2 Drawing Sheets

METHOD FOR INSTALLING A DUCT IN THE GROUND AND DEVICE FOR PERFORMING THIS METHOD

This application is a U.S. National Phase Application under 35 USC 371 of International Application PCT/EP01/06940 filed Jun. 18, 2001.

The invention relates to a method for installing a duct in the ground, whereby a longitudinal organ is already present in the ground near the route along which the duct is to be installed, whereby the existing longitudinal element is used as a guide for the duct to be installed and the duct is pushed into the ground with the aid of a fluid under pressure fed through the duct.

Such a method is known from U.S. Pat. No. 5,639,183. The known method is intended to replace an existing telecom cable, in particular a copper cable, by installing a duct through which an optical cable can be fed. With this method the existing cable is dug free at a suitable point and cut through. The duct is then pushed over an end that has been freed in this way. In order to install the duct around the existing cable over a greater length in the ground, a liquid, for example water, is fed under pressure via the duct, to the free end thereof, which flushes away the ground around the existing cable, while at the same time the duct is pushed forwards. In this way a duct, or a duct consisting of a plurality of coupled segments, can be installed over a large distance in the ground over an existing cable without the need for much digging. After the installation, the cable can, if desired, be pulled out of the duct.

The known method is particularly suitable for replacing existing copper telecommunication cable by a cable-duct in which optical fibre cable can be installed in order, for example, to install optical fibre right up to the user, i.e. up to the dwelling or the business. The optical fibre cable can, for example, be installed in the duct by means of blowing or pulling, with installation by means of blowing being preferred, since the forces exerted on the optical fibre cable by this method are distributed over the whole length, thus avoiding damage due to excessive tensile forces. Such a method for blowing in a cable is described in EP-A-0 292 037. In addition, a combination of blowing and pulling is possible by attaching a so-called shuttle to the end of the optical fibre cable.

In some situations it is undesirable to cut the existing cable in order to be able to push the duct over it. This is, for example, the case if the cable must remain available for other purposes, for example for use by another provider of telecommunication services. It is an object of the present invention to provide a solution for this problem. To this end, the invention provides a method for performing the above-mentioned procedure, whereby the duct to be installed is coupled by at least one divisible coupling piece to the existing longitudinal element and whereby the coupling element is advanced along the existing longitudinal element.

The invention is based on the understanding that it is possible, without interrupting the longitudinal element already present in the ground, nevertheless to use this element as a guide for installing a new duct. The longitudinal element will in many cases be a telecommunication cable or a cable suitable for other purposes, but an existing gas or water pipe, for example, can also be used as a guide. The duct will in most cases be a cable-duct, but the invention may also be used advantageously to install other ducts, such as for example flexible water or gas pipes.

The invention further provides a device for installing a duct under the ground in the vicinity of an existing longitudinal element comprising: a divisible coupling piece provided with means to attach the coupling piece movably along the longitudinal element and means to connect the duct immovably to one end of the coupling element, as well as means to allow a fluid fed through the duct to flow out via the other, opposite, end.

If the tubular organ needs to be installed over great distances, it may be desirable for the duct being installed to be coupled at intervals to the existing longitudinal element. To this end, the invention provides coupling means which are similar to the coupling means described above, but are provided with a coupling channel for the duct being installed, running from one end to the other end, and whereby there should be no nozzle for the fluid.

The fluid used for the installation can, as in the known method, be a liquid such as water, but can also be a gas, such as air. In many cases, the installation of the duct will not require the use of a relatively complex above-ground installation, such as described in the above-mentioned U.S. Pat. No. 5,639,183, but a simple pump to feed liquid or gas under pressure to the inlet opening of the duct being installed will be sufficient and enable the duct to be inserted by manual effort.

The invention will now be explained further by describing an embodiment with reference to the drawing, in which:

FIG. 1b is a perspective view of the coupling piece according to FIG. 1a;

FIG. 1a shows schematically a longitudinal element 1 already present in the ground, such as a telecommunication cable, and a duct 2 to be installed, such as a cable-duct for optical cables.

Figure 1A:
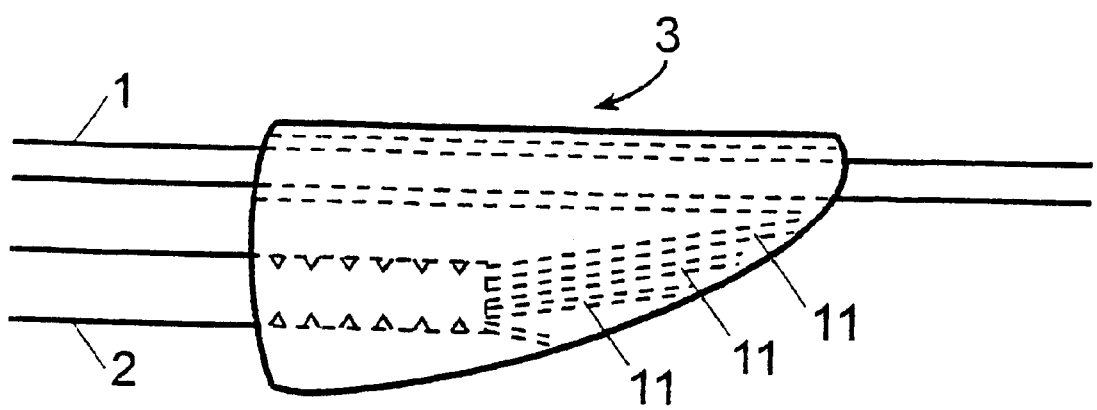
FIG. 1a shows a side view of the coupling piece according to the invention, connected to a cable and a cable-duct to be installed.
Figure 1B:
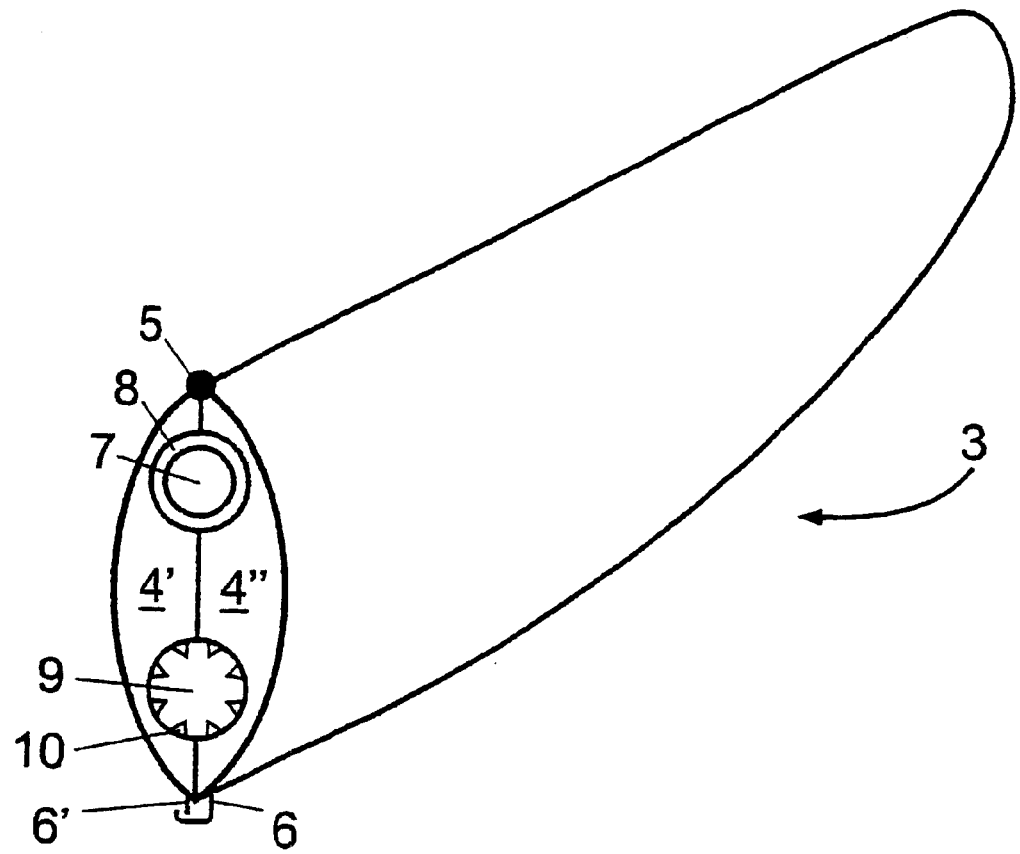

A coupling piece 3, shown in perspective in FIG. 1b, comprises a divisible body 4 consisting of a part 4' and a part 4", which are preferably pivotally connected by means of a flexible lip 5 or similar and are provided at the side opposite the lip 5 with closure means 6, 6', for example a snap connection, known per se. The parts 4', 4" can also be separate from each other and connected by means of, for example, a double snap connection to the opposite sides of the coupling element, or in any other manner known to those skilled in the art.

The coupling piece 3 possesses an elongated guide opening 7, which can he placed around the longitudinal element 1 and is provided with, for example, plastic or rubber guides and/or sealing elements 8. Parallel to the guide opening 7 extends an elongated insertion opening 9 designed to be connected to a duct to be installed. The inner surface of insertion opening 9 is provided with teeth 10 or similar means to connect the duct immovably to the coupling piece 3, when the latter is in a closed state. The insertion opening 9 is provided at the front side, i.e. opposite the open side of the insertion opening 9, with outflow channels 11 for a fluid, such as liquid or gas, that is fed under pressure via the duct 2 and that serves to flush away or blow away the ground in front of the coupling piece during the installation of the duct. For further details of the introduction of a duct into the ground in this way, refer to the description given in the above-mentioned U.S. Pat. No. 5,639,183.

Figure 2:
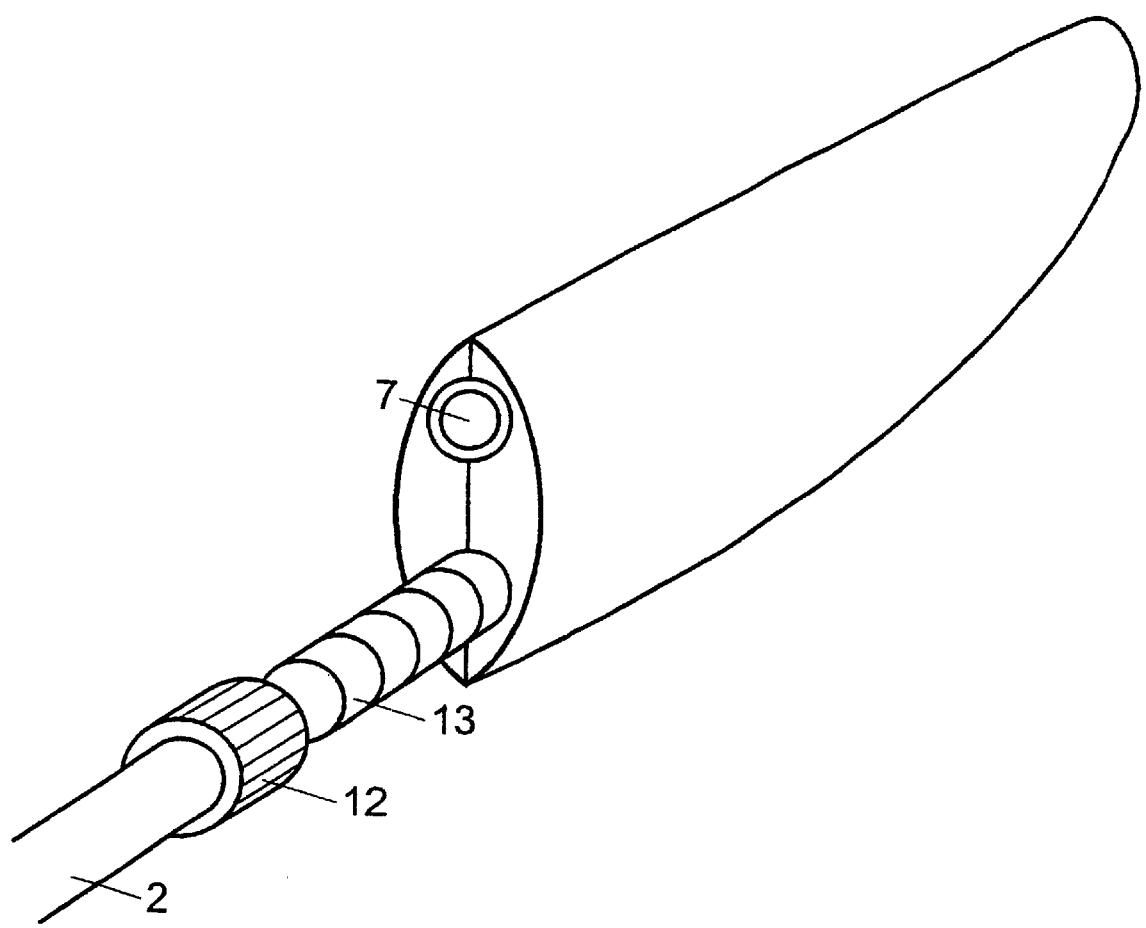
FIG. 2 is a second embodiment of the coupling piece in perspective.

FIG. 2 shows a variant of the coupling piece in which, instead of the insertion opening with teeth 10, use is made of a coupling element 12 attached to duct 2 and a connecting branch 13 attached to the coupling piece 3. For coupling element 12 and connecting branch 13, similar elements generally known for connecting garden hoses can also be used.

Figure 3:
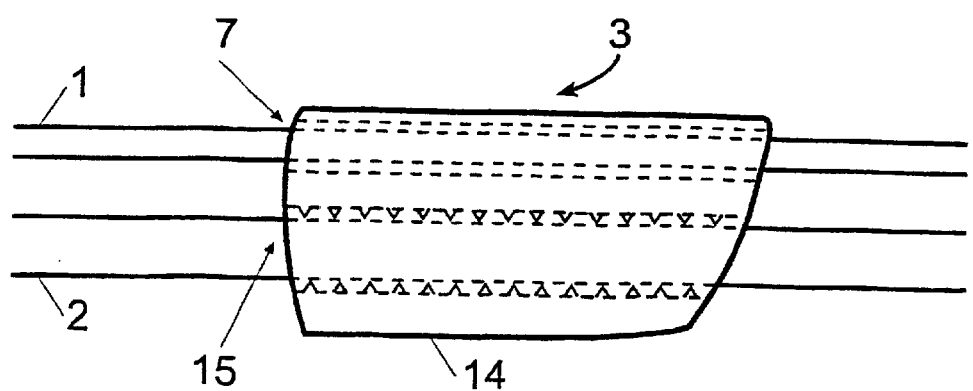
FIG. 3 is a coupling piece that can be used as a follower guide.

FIG. 3 shows a guide element 14, that also consists of two parts and, like the coupling element 3, can also be placed around the duct 2 and the longitudinal element 1. The guide opening 7 is the same as for the coupling element 3, but the insertion opening 9 is now replaced by a through opening 15 provided with internal teeth or similar to enable immovable attachment to the duct 2. The guide element 14 ensures that even for great installation lengths, the duct will always remain in the vicinity of the longitudinal element.

The coupling elements 3 and the guide element 14 can be made of plastic or, if a long service life is required, of metal. The teeth 10 may be replaceable in order to assure a long service life of the coupling element.

What is claimed is:

1. A method for installing a duct in the ground, proximate a longitudinal element, the method comprising the steps of:
   moveably securing a coupling device to the longitudinal element such that the coupling device is moveable along the length of the longitudinal element, and fixedly attaching the coupling device to an end of the duct;
   pushing the duct such that it advances in a substantially parallel manner with respect to the longitudinal element, and
   causing a fluid under pressure to flow through the duct towards and out of the end of the duct to which the coupling device is attached, wherein
   the coupling device includes a coupling piece having two connectable parts which are disposed about the longitudinal element, an insertion opening in which the end of the duct is immovably connected to the coupling device, and an elongated guide opening through which the longitudinal element is moved during pushing of the duct.

2. The method of claim 1, wherein the coupling device includes outflow channels fluidly coupled to an interior portion of the duct such that the fluid which is provided under pressure to the duct and flows out of the end of the duct is expelled through the outflow channels.

3. The method of claim 2, further comprising the step of securing a second coupling piece at a distance from the coupling piece which is connected to the end of the duct, the second coupling piece being longitudinally moveably disposed about the longitudinal element and immovably disposed about the duct.

4. The method of claim 3, wherein the second coupling piece includes two connectable parts which are disposed about the longitudinal element and the duct, the second coupling piece comprising an insertion opening for immovable coupling to the duct, and an elongated guide opening through which the second coupling piece moves with respect to the longitudinal element during pushing of the duct.

5. The method of claim 1, further comprising the step of securing a second coupling piece at a distance from the coupling piece which is connected to the end of the duct, the second coupling piece being longitudinally moveably disposed about the longitudinal element and immovably disposed about the duct.

6. The method of claim 5, wherein the second coupling piece includes two connectable parts which are disposed about the longitudinal element and the duct, the second coupling piece comprising an insertion opening for immovable coupling to the duct, and an elongated guide opening through which the second coupling piece moves with respect to the longitudinal element during pushing of the duct.

7. Apparatus for a duct in the ground proximate a longitudinal element, comprising:
   a coupling device operatively coupled to an end portion of the duct and the longitudinal element, and
   means coupled to the duct for causing a fluid to flow through the duct towards and out of the end of the duct, wherein
   the coupling device includes a coupling piece having two connectable parts which are disposed about the longitudinal element, an insertion opening in which the end of the duct is immovably connected, and an elongated guide opening through which the longitudinal element is moved during installation of the duct.

8. The apparatus of claim 7, wherein the two connectable parts are disposed and connected to each other and define outflow channels through which, during installation of the duct, the fluid which is provided under pressure to the duct flows out of the end of the duct and is expelled through the outflow channels.

9. The apparatus of claim 8, wherein the two connectable parts of the coupling device are, on one side, pivotally connected to each other by a flexible lip, and on a side opposite the flexible lip, provided with a closure.

10. The apparatus of claim 9, wherein an inner surface of the insertion opening comprises teeth for immovably connecting the coupling device with the end of the duct.

11. The apparatus of claim 9, wherein the insertion opening of the coupling device comprises a connecting branch provided with a coupling element for attaching to the end of the duct to be installed.

12. The apparatus of claim 11 further comprising a second coupling piece comprising an insertion opening for immovable attachment to the duct to be installed, and an elongated guide opening through which the longitudinal element is movable during installation of the duct.

13. The apparatus of claim 8, wherein an inner surface of the insertion opening comprises teeth for immovably connecting the coupling device with the end of the duct.

14. The apparatus of claim 8, wherein the insertion opening of the coupling device comprises a connecting branch provided with a coupling element for attaching to the end of the duct to be installed.

15. The apparatus of claim 7, wherein the two connectable parts of the coupling device are, on one side, pivotally connected to each other by a flexible lip, and on a side opposite the flexible lip, provided with a closure.

16. The apparatus of claim 15, wherein an inner surface of the insertion opening comprises teeth for immovably connecting the coupling device with the end of the duct.

17. The apparatus of claim 15, wherein the insertion opening of the coupling device comprises a connecting branch provided with a coupling element for attaching to the end of the duct to be installed.

18. The apparatus of claim 7, wherein an inner surface of the insertion opening comprises teeth for immovably connecting the coupling device with the end of the duct.

19. The apparatus of claim 7, wherein the insertion opening of the coupling device comprises a connecting branch provided with a coupling element for attaching to the end of the duct to be installed.

20. The apparatus of claim 7, further comprising a second coupling piece comprising an insertion opening for immovable attachment to the duct to be installed, and an elongated guide opening through which the longitudinal element is movable during installation of the duct.

* * * * *